US011734057B2

(12) United States Patent
Li

(10) Patent No.: US 11,734,057 B2
(45) Date of Patent: Aug. 22, 2023

(54) METHOD AND APPARATUS FOR PROCESSING A SERVICE OF AN ABNORMAL SERVER

(71) Applicant: BEIJING BAIDU NETCOM SCIENCE AND TECHNOLOGY CO., LTD., Beijing (CN)

(72) Inventor: Ye Li, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 148 days.

(21) Appl. No.: 16/896,360

(22) Filed: Jun. 9, 2020

(65) Prior Publication Data

US 2021/0165681 A1 Jun. 3, 2021

(30) Foreign Application Priority Data

Nov. 29, 2019 (CN) .......................... 201911206796.5

(51) Int. Cl.
*G06F 9/46* (2006.01)
*G06F 9/48* (2006.01)

(52) U.S. Cl.
CPC ................................. *G06F 9/4856* (2013.01)

(58) Field of Classification Search
CPC .................................................. G06F 9/4856
USPC ....................................................... 718/100
See application file for complete search history.

(56) References Cited

U.S. PATENT DOCUMENTS

| 9,106,537 B1* | 8/2015 | Emelyanov | ............. | H04L 69/40 |
| 9,594,801 B2* | 3/2017 | Wong | ...................... | H04L 67/10 |
| 10,185,597 B1* | 1/2019 | Emelyanov | ........... | G06F 9/4856 |
| 10,489,232 B1* | 11/2019 | BeSerra | .............. | G06F 11/0709 |

(Continued)

FOREIGN PATENT DOCUMENTS

| CN | 103209171 A | 7/2013 |
| CN | 105530313 A | 4/2016 |

(Continued)

OTHER PUBLICATIONS

Japanese Patent Application No. 2020-099542 Notice of Reasons for Refusal dated Oct. 19, 2021 3 pages.

(Continued)

*Primary Examiner* — Mehran Kamran
(74) *Attorney, Agent, or Firm* — Cozen O'Connor

(57) ABSTRACT

Embodiments of the present application disclose a method and apparatus for processing a service of an abnormal server, and relate to the field of cloud computing. An embodiment of the method comprises: acquiring, according to a service type of a service distributed on the abnormal server, a service migration instruction corresponding to the service type, in response to determining that the abnormal server exists in a public cloud system; generating abnormal report information according to abnormal information on the abnormal server and the service migration instruction, and sending the abnormal report information to a user who has the service of the service type, which corresponds to the service migration instruction; executing the service migration instruction corresponding to the service type of the service to migrate the user's service, according to the migration indication information acquired from the user.

15 Claims, 10 Drawing Sheets

(56) References Cited

U.S. PATENT DOCUMENTS

| | | | | |
|---|---|---|---|---|
| 10,684,888 | B1* | 6/2020 | Sethuramalingam | ........................ G06F 9/45558 |
| 10,853,111 | B1* | 12/2020 | Gupta | ................. G06F 9/45558 |
| 10,932,145 | B1* | 2/2021 | Ho | ........................ H04W 24/04 |
| 10,997,132 | B2* | 5/2021 | Shivam | ................. G06F 16/214 |
| 2003/0182427 | A1* | 9/2003 | Halpern | ............... G06F 11/1482 709/225 |
| 2012/0096134 | A1* | 4/2012 | Suit | ..................... H04L 41/0853 709/221 |
| 2012/0101973 | A1* | 4/2012 | Ito | ........................ G06F 16/185 706/50 |
| 2012/0179817 | A1* | 7/2012 | Bade | ................. G06F 9/45558 709/225 |
| 2013/0268805 | A1* | 10/2013 | Lee | ..................... G06F 11/1484 714/15 |
| 2014/0108861 | A1* | 4/2014 | Abadi | ................. G06F 11/2028 707/718 |
| 2014/0310409 | A1* | 10/2014 | Ohsuga | .................. H04L 43/08 709/224 |
| 2015/0096011 | A1* | 4/2015 | Watt | ....................... G06F 3/0647 726/15 |
| 2015/0124584 | A1* | 5/2015 | Olrog | ................ H04L 43/0817 370/218 |
| 2016/0036924 | A1* | 2/2016 | Koppolu | ................ H04L 43/10 709/224 |
| 2016/0378532 | A1* | 12/2016 | Vincent | ................. G06F 9/5088 718/1 |
| 2017/0168907 | A1* | 6/2017 | Harper | ................ G06F 11/2025 |
| 2017/0249215 | A1* | 8/2017 | Gandhi | ............... G06F 11/1438 |
| 2017/0293540 | A1* | 10/2017 | Mehta | ..................... G06F 11/14 |
| 2017/0339622 | A1* | 11/2017 | Condeixa | ................ H04L 67/63 |
| 2017/0345015 | A1* | 11/2017 | Ranganna | ............ H04L 43/091 |
| 2018/0129523 | A1* | 5/2018 | Bryant | ................ G06F 9/45558 |
| 2020/0089424 | A1* | 3/2020 | Klein | .................. G06F 11/1076 |
| 2020/0097349 | A1* | 3/2020 | Mahindru | ........... G06F 11/0793 |
| 2020/0104202 | A1* | 4/2020 | Stupak | ................ G06F 11/1451 |
| 2020/0117494 | A1* | 4/2020 | Cortez | ................... G06F 9/4856 |
| 2020/0183722 | A1* | 6/2020 | Kumar | ................ G06F 9/45558 |
| 2020/0310847 | A1* | 10/2020 | Schulze | .................. H04L 67/10 |
| 2020/0310853 | A1* | 10/2020 | Featonby | ............ G06F 9/5077 |
| 2020/0379857 | A1* | 12/2020 | Shah | ................... G06F 11/2007 |
| 2021/0027401 | A1* | 1/2021 | Hovhannisyan | ............................. G06Q 10/06315 |
| 2021/0034474 | A1* | 2/2021 | Khandkar | ............. G06F 16/183 |
| 2021/0084103 | A1* | 3/2021 | Smith | ................... G06F 9/5077 |
| 2021/0195806 | A1* | 6/2021 | Kommula | ............... G06F 30/20 |
| 2021/0232469 | A1* | 7/2021 | Gill | ..................... G06F 11/2041 |

FOREIGN PATENT DOCUMENTS

| | | |
|---|---|---|
| CN | 108648786 A | 10/2018 |
| JP | 2015-170251 A | 9/2015 |
| JP | 2018-55518 A | 4/2018 |
| WO | WO 2013-035243 A1 | 3/2013 |
| WO | WO 2017/049941 A1 | 3/2017 |

OTHER PUBLICATIONS

English translation of Japanese Patent Application No. 2020-099542, Notice of Reasons for Refusal dated Oct. 19, 2021 3 pages.

* cited by examiner

METHOD AND APPARATUS FOR PROCESSING A SERVICE OF AN ABNORMAL SERVER

CROSS-REFERENCE TO RELATED APPLICATIONS

This application claims priority to Chinese Patent Application No. 201911206796.5, filed on Nov. 29, 2019, titled "method and apparatus for processing a service of an abnormal server", which is hereby incorporated by reference in its entirety.

TECHNICAL FIELD

Embodiments of the present application relate to the field of computer technology, and more particularly, to a service processing method and apparatus for an abnormal server.

BACKGROUND

In recent years, with a continuous expansion of scales and types of the public cloud service, the number of servers on the public cloud has been increased. The expansion in the scale of the server will inevitably lead to an increase in the number of abnormal servers, which in turn will inevitably bring more hidden risks to online services.

In the conventional process for making the abnormal server offline, it is generally required that all of the customer service part, the customer, the operation and maintenance part, and the development part to cooperate to complete the migration operation of the customer service. Due to a wide variety of services, the coordination of these four parties becomes complicated, the service migration process is cumbersome, and customer experience is poor.

SUMMARY

The embodiment of the application provides a method and apparatus for processing a service of an abnormal server.

According to a first aspect, an embodiment of the present application provides a method for processing a service of an abnormal server, wherein the method comprises: acquiring, according to a service type of a service distributed on the abnormal server, a service migration instruction corresponding to the service type, in response to determining that the abnormal server exists in a public cloud system; generating abnormal report information according to abnormal information on the abnormal server and the service migration instruction, and sending the abnormal report information to a user who has the service of the service type, which corresponds to the service migration instruction; executing the service migration instruction corresponding to the service type of the service to migrate the user's service, according to the migration indication information acquired from the user.

In some embodiments, before the acquiring, according to a service type of a service distributed on the abnormal server, a service migration instruction corresponding to the service type, in response to determining that the abnormal server exists in a public cloud system, the method further comprises: scanning servers running in the public cloud system; and determining, according to a preset abnormal determination information acquired through the scanning, whether the abnormal server exists in the public cloud system.

In some embodiments, after the executing the service migration instruction corresponding to the service type of the service to migrate the user's service, according to the migration indication information acquired from the user, the method further comprises: executing an offline instruction to make the abnormal server offline, in response to determining that a service migration operation indicated by the service migration instruction have been performed for all services on the abnormal server.

In some embodiments, after in response to determining that the abnormal server exists in a public cloud system, the method further comprises: adding information on the abnormal server into a server blacklist.

In some embodiments, after generating abnormal report information according to abnormal information on the abnormal server and the service migration instruction, and sending the abnormal report information to a user who has the service of the service type, which corresponds to the service migration instruction, the method further comprises: updating, in response to receiving a update information, the service migration instruction according to the received update information.

In some embodiments, the method further comprises: generating abnormal processing progress information in response to determining that a preset time expires, wherein the abnormal processing progress information includes processed abnormal information, progress information on the abnormal information being processed, and unprocessed abnormal information.

According to a second aspect, an embodiment of the present application provides a apparatus for processing a service of an abnormal server, wherein the apparatus comprises: a migration instruction acquiring unit, configured to acquire, according to a service type of a service distributed on the abnormal server, a service migration instruction corresponding to the service type, in response to determining that the abnormal server exists in a public cloud system; an abnormal reporting unit, configured to generate abnormal report information according to abnormal information on the abnormal server and the service migration instruction, and send the abnormal report information to a user who has the service of the service type, which corresponds to the service migration instruction; a migration instruction execution unit, configured to execute the service migration instruction corresponding to the service type of the service to migrate the user's service, according to the migration indication information acquired from the user.

In some embodiments, the apparatus further comprises: a scanning unit configured to, scan servers running in the public cloud system, and determine, according to a preset abnormal determination information acquired through the scanning, whether the abnormal server exists in the public cloud system.

In some embodiments, the apparatus further comprises an offline instruction execution unit configured to execute an offline instruction to make the abnormal server offline, in response to determining that a service migration operation indicated by the service migration instruction have been performed for all services on the abnormal server.

In some embodiments, the apparatus further comprises: a blacklist setting unit configured to add information on the abnormal server into a server blacklist.

In some embodiments, the apparatus further comprises: an update unit configured to, in response to receiving update information, update the service migration instruction according to the received update information.

In some embodiments, the apparatus further comprises: a progress reporting unit, configured to generate abnormal processing progress information in response to determining that a preset time expires, wherein the abnormal processing progress information includes processed abnormal information, progress information on the abnormal information being processed, and unprocessed abnormal information.

In a third aspect, an embodiment of the present application provides a computer readable medium, with computer programs store thereon, wherein the program, when executed by a processor, implements the method as described in any one of the implementations of the first aspect.

In a fourth aspect, an embodiment of the present application provides an electronic apparatus, comprising: one or more processors; storage devices, with one or more programs store thereon; when the one or more programs, when executed by the one or more processors, cause the one or more processors to implement the method as described in any of the implementations of the first aspect.

The method and apparatus for processing a service of an abnormal server provided in the embodiments of the present application, first acquiring, according to a service type of a service distributed on the abnormal server, a service migration instruction corresponding to the service type, in response to determining that the abnormal server exists in a public cloud system; then, generating abnormal report information according to abnormal information on the abnormal server and the service migration instruction, and sending the abnormal report information to a user who has the service of the service type, which corresponds to the service migration instruction; then, executing the service migration instruction corresponding to the service type of the service to migrate the user's service, according to the migration indication information acquired from the user. The present application acquiring, according to a service type of a service in the abnormal server, a service migration instruction corresponding to the service type; and reporting to a user who has the service in the abnormal server; performing, according to the indication information of the user, the service migration, thereby simplifying the service migration process and improving the service migration efficiency and the customer experience.

BRIEF DESCRIPTION OF THE DRAWINGS

Other features, objects, and advantages of the present application will become more apparent by reading the detailed description of non-limiting embodiments made with reference to the following drawings.

DETAILED DESCRIPTION OF EMBODIMENTS

Figure 1:
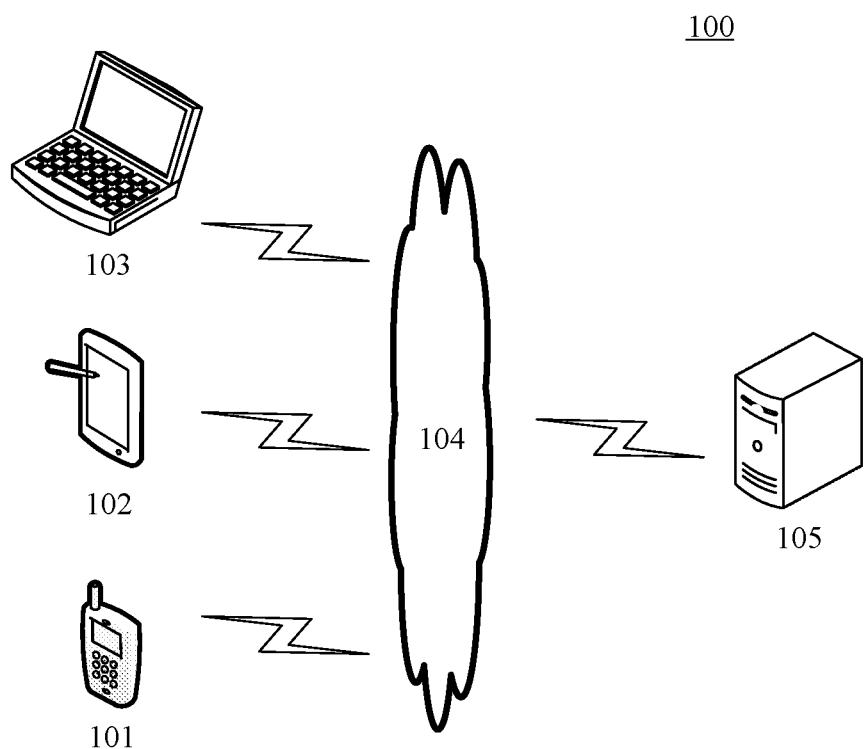
FIG. 1 is an exemplary system architecture diagram in which an embodiment of the present application may be applied.

The present application is described in further detail below with reference to the accompanying drawings and embodiments. It is to be understood that the specific embodiments described herein are merely illustrative of the related invention and are not restrictive of the invention. It is also to be noted that, for ease of description, only parts related to the invention are shown in the drawings.

It should be noted that the embodiments in the present application and the features in the embodiments may be combined with each other without conflict. The present application will now be described in detail with reference to the accompanying drawings and embodiments.

FIG. 1 illustrates an exemplary architecture 100 in which a method and apparatus for processing a service of an abnormal server of the present application may be applied.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless transmission links, or optical fibers.

The terminal devices 101, 102, 103 may be hardware devices or software that support network connections for data input and data interaction. When the terminal devices 101, 102, 103 are hardware, they may be various electronic devices supporting functions such as information exchange, network connection, and the like, including but not limited to a smartphone, a tablet computer, an electronic book reader, a laptop portable computer, a desktop computer, and the like. When the terminal devices 101, 102, and 103 are software, they may be installed in the electronic devices listed above. It may be implemented, for example, as a plurality of software or software modules for providing distributed services, or as a single software or software module. It is not specifically limited herein.

The server 105 may be a server providing various services, for example, identifying abnormal servers in a public cloud system and servers that provide data interaction to the terminal devices 101, 102, 103. The server may store and process various received data and feed back the processing result to the terminal device.

It should be noted that a method for processing a service of an abnormal server provided in the embodiment of the present disclosure may be executed by the server 105. Accordingly, an apparatus for processing a service of an abnormal server may be provided in the server 105.

It should be noted that the server may be hardware or software. When the server is hardware, a distributed server cluster composed of multiple servers may be implemented, or a single server may be implemented. When the server is software, it may be implemented, for example, as a plurality of software or software modules for providing distributed services, or it may be implemented as a single software or software module. It is not specifically limited herein.

It should be understood that the number of storage devices and servers in FIG. 1 is merely illustrative. There may be any number of terminal devices and servers as required by the implementation.

Figure 2:
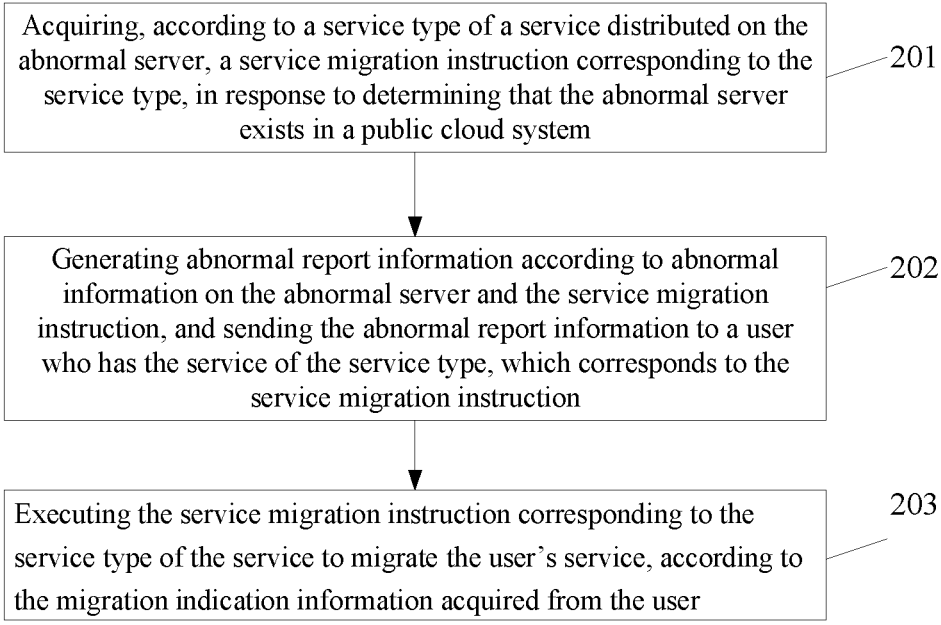
FIG. 2 is a flow chart of an embodiment of a method for processing a service of an abnormal server according to the present application.

Further referring to FIG. 2, a flow 200 of an embodiment of a method for processing a service of an abnormal server according to the present application is shown, including the following steps.

Step 201: acquiring, according to a service type of a service distributed on the abnormal server, a service migration instruction corresponding to the service type, in response to determining that the abnormal server exists in a public cloud system.

In the present embodiment, a public cloud system refers to a cloud service system provided by a cloud service provider to a user for using. Cloud service providers provide cloud services directly to external users through their own infrastructure. External users access services through the Internet and do not own cloud computing resources.

The abnormal server may be a server in which various abnormal conditions occur, including, but not limited to, a hardware failure, a software failure, a component failure, an exceeding of the warranty period. The increasing number of abnormal servers will inevitably bring more risks to online services in public cloud systems. In order to improve the stability of the public cloud system service, the services in the abnormal server needs to be migrated.

In the present embodiment, an execution entity (for example, a server in FIG. 1) first determines an abnormal server in a public cloud system, then acquires all services running in the abnormal server, and identifies a service type to which the service belongs. Then, the service migration instruction is acquired according to the correspondence between the service type and the service migration instruction.

In some alternative implementations, a service type identifier may be added to the service migration instruction, and the service type identifier is used to characterize a service type corresponding to the service migration instruction.

Wherein, a plurality of service migration instructions are pre-stored in the execution entity for executing migration processing on a service under the service type in the abnormal server, wherein, each service migration instruction is used for one service type. Preferably, the service migration instruction pre-stored in the execution entity covers all service types in the public cloud system.

In the present embodiment, the service migration instruction may be a service migration instruction preset by a technician according to a service type, and the service migration instruction may include a migration time, flow information of service migration, and information on a server for receiving the migration service. The migration time may be determined according to the impact degree of the migration operation on the service of the service type, and a time period with less service running load is selected as the migration time. The server receiving the migration service can be configured with the network configuration parameters of the original server where the service to be migrated is located to solve the compatibility problem.

Step 202: generating abnormal report information according to abnormal information on the abnormal server and the service migration instruction, and sending the abnormal report information to a user who has the service of the service type, which corresponds to the service migration instruction.

In the present embodiment, after the execution entity acquires the service migration instruction corresponding to the service type of the service in the abnormal server, the execution entity generates the abnormal report information according to abnormal information on the abnormal server and the service migration instruction, and reports the abnormal report information to a user who has the service of the service type, which corresponds to the service migration instruction. The user who has the service is a user who purchases a cloud service from a cloud service provider to perform the service. For example, the company A purchases a cloud service from a cloud service provider B to perform a live service, and the user who has the live service may be understood as the company A that purchases the cloud service of the cloud service provider B.

Corresponding to the abnormal conditions of the abnormal server as discussed in step 201, the abnormal information on the abnormal server includes the abnormal information indicating hardware failure, the abnormal information indicating a software failure, the abnormal information indicating a component failure, and the abnormal information indicating an exceeding of the warranty period.

The abnormal report information generated by the execution entity according to the abnormal information on the abnormal server and the service migration instruction includes the abnormal information, the abnormal impact, the impact range, the impact duration, and the migration time of the service migration instruction. Among them, the abnormal impact is used to characterize the impact of the abnormal condition of the abnormal server on the service running in the abnormal server, for example, the server may be down, causing the customer service to shut down, or the software is vulnerable, and the data may be lost. The impact range is used to characterize the service range of the user affected by the abnormal server, for example, when the service running in the abnormal server includes two services of the user A, the impact range includes the above two services of the user A.

The execution entity sends the abnormal report information to the user, and the user may understand the impact of the abnormal condition of the abnormal server on the service of the user, so that the user may make the migration indication information in time.

Step 203: executing the service migration instruction corresponding to the service type of the service to migrate the user's service, according to the migration indication information acquired from the user.

In the present embodiment, in step 202, the user understands in time, according to the abnormal report information, the impact to the service of the user, which was caused from the abnormal condition of the abnormal server, and understands the migration time of the service. According to the understood information, the user may make the migration indication information for executing the service migration, or may make the indication information for not executing the service migration temporarily.

In the present embodiment, the execution entity executes the service migration instruction, which corresponds to the service type of the user's service, to migrate the user's service, in response to determining the migration indication information is acquired from the user to execute the service migration according to the service migration instruction.

It is to be understood that if the user indicates not to execute service migration temporarily, the service may not be migrated.

Figure 3:
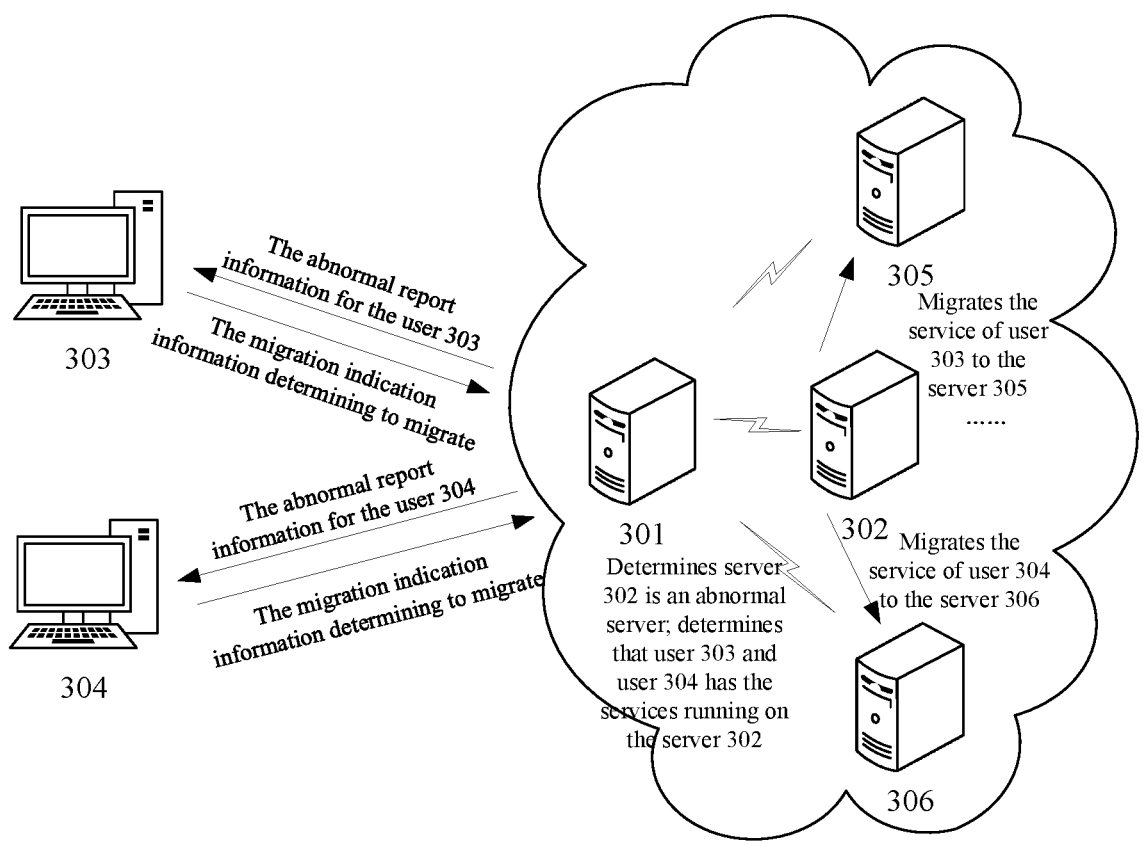
FIG. 3 is a schematic diagram of an application scenario of a method for processing a service of an abnormal server according to the present embodiment.

FIG. 3 schematically shows an application scenario of a method for processing a service of an abnormal server according to the present embodiment. Public cloud systems providers provide cloud computing services to numerous users. In the process of providing cloud computing services to users by the servers of public cloud system providers, the server 301 as the execution entity of the present application may determine that the server 302 in the public cloud system is an abnormal server. Then, the server 301 may determine that the service running on the server 302 includes the live service of the user 303 and the database service of the user 304, may acquire the service migration instruction for the live service of the user 303 according to the service type of the live service of the user 303, and acquire the service migration instruction for the database service of the user 304 according to the database service of the user 304.

The server 301 generates abnormal report information for the user 303 according to abnormal information on the abnormal server 302 and the service migration instruction for the live service of the user 303, and sends the abnormal report information to the user 303; the server 301 generates abnormal report information for the user 304 according to abnormal information on the abnormal server 302 and the service migration instruction for the database service of the user 304, and sends the abnormal report information to the user 304. Then, the server 301 executes the service migration instruction corresponding to the service type of the service to migrate the service of the user 303 and services of user 304, according to the migration indication information acquired from the user 303 and user 304, so as to migrate the live service of the user 303 to the server 305, and migrate the database service of the user 304 to the server 306.

In the present embodiment, the execution entity automatically acquires the corresponding migration instruction according to the service type of the service in the abnormal server, reports to a user who has the service in the abnormal server, and performs service migration according to the indication information of the user, thereby simplifying the service migration process and improving the service migration efficiency and the customer experience.

Figure 4:
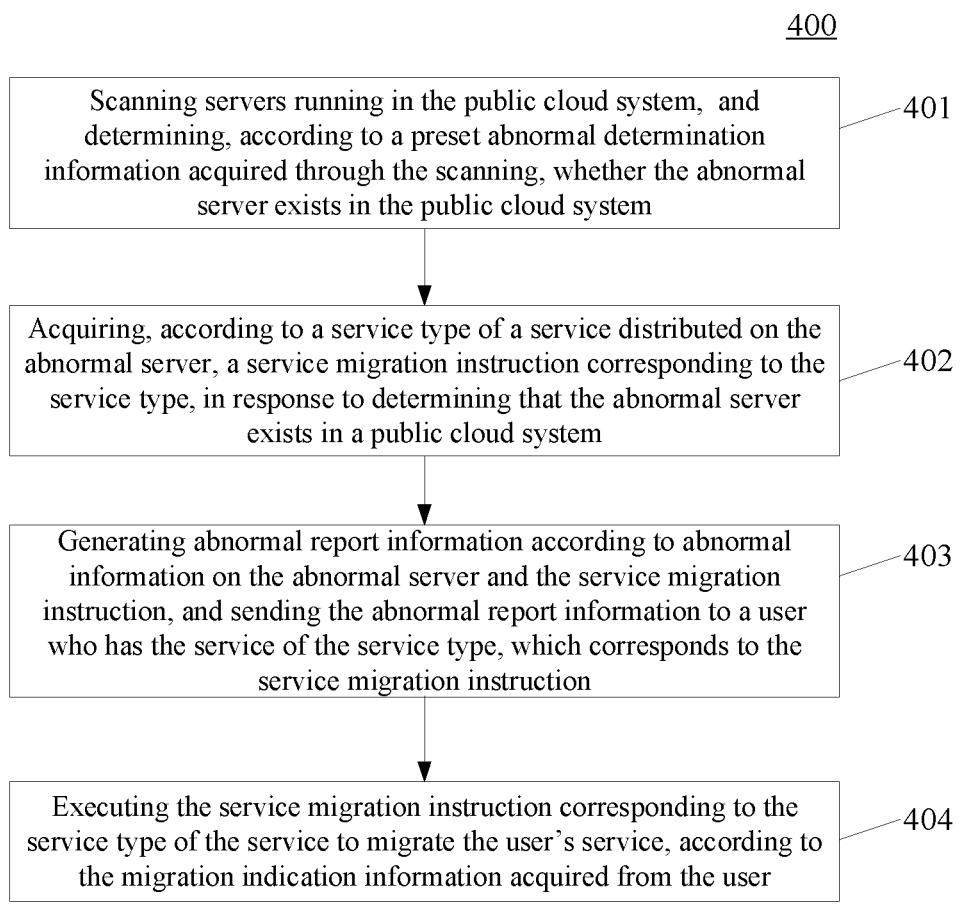
FIG. 4 is a flow chart of yet another embodiment of a method for processing a service of an abnormal server according to the present application.

Referring to FIG. 4, there is shown a schematic flow 400 of another embodiment of a method for processing a service of an abnormal server according to the present application, including the steps of:

Step 401: scanning servers running in the public cloud system; and determining, according to a preset abnormal determination information acquired through the scanning, whether the abnormal server exists in the public cloud system.

In the present embodiment, the execution entity (for example, the server in FIG. 1) performs network connection with the server in the public cloud system, scans the operation of the hardware, software, and components of the server in the public cloud system, acquires information such as the resource usage rate of the server, the system load condition, and the software and hardware operation parameters, and monitors whether the server exceeds the warranty period. The execution entity further determines whether or not an abnormal server exists in the public cloud system according to the acquired preset abnormal determination information.

The abnormal determination information is used to determine whether the server in the public cloud system has abnormality information. The abnormal determination information may be abnormal determination information of the configuration of the public cloud system itself, or may be abnormal determination information provided by a technician according to normal operation parameters of the public cloud system. For example, the abnormal determination information on the hardware may be abnormal determination information for hardware failure detection supported by the public cloud system, the public cloud system has a monitoring alarm function for hardware facilities such as an internal server. In response to receiving the alarm information on the relevant hardware, it will be indicated that the hardware failure exists in the public cloud system. The abnormal determination information of the software and components in the public cloud system may be abnormal determination information provided by the relevant technician according to normal operating parameters of the software or components.

In some alternative implementations of the present embodiment, the execution entity scans all servers running in the public cloud system in real time, and determines that the server conforming to the abnormal determination information is an abnormality server.

Step 402: acquiring, according to a service type of a service distributed on the abnormal server, a service migration instruction corresponding to the service type, in response to determining that the abnormal server exists in a public cloud system;

In the present embodiment, step 402 is performed in a manner similar to step 201, and details thereof are not described herein.

Step 403: generating abnormal report information according to abnormal information on the abnormal server and the service migration instruction, and sending the abnormal report information to a user who has the service of the service type, which corresponds to the service migration instruction.

In the present embodiment, step 403 is performed in a manner similar to step 202, and details thereof are not described herein.

Step 404: executing the service migration instruction corresponding to the service type of the service to migrate the user's service, according to the migration indication information acquired from the user.

In the present embodiment, step 404 is performed in a manner similar to step 203, and details thereof are not described herein.

As can be seen from FIG. 4, compared with the embodiment shown in FIG. 2, the flow 400 of the method for processing a service of an abnormal server in the present embodiment specifically describes that the execution entity monitors the server in the public cloud system in real time, and automatically determines whether the abnormal server exists in the public cloud system according to the preset abnormal determination information, thereby improving the perception efficiency for the abnormal server.

Figure 5:
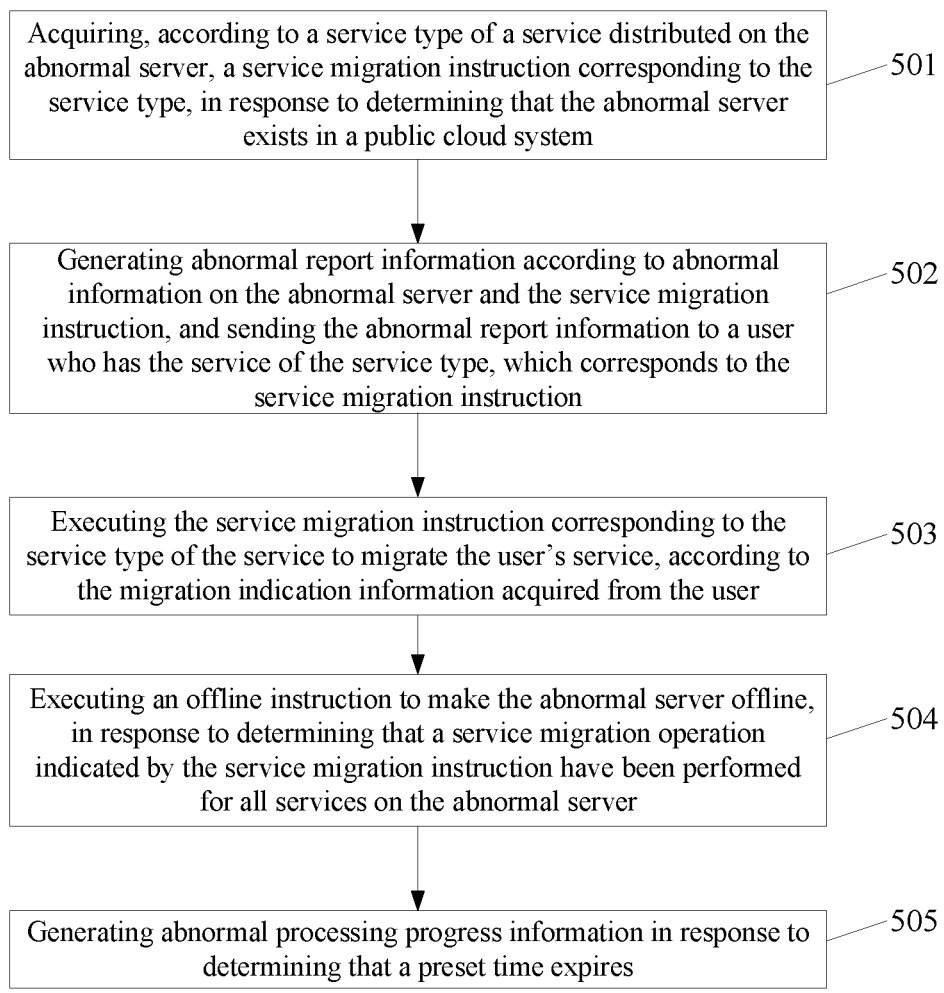
FIG. 5 is a flow chart of yet another embodiment of a method for processing a service of an abnormal server according to the present application.

Referring to FIG. 5, there is shown a schematic flow 400 of another embodiment of a method for processing a service of an abnormal server according to the present application, including the steps of:

Step 501: acquiring, according to a service type of a service distributed on the abnormal server, a service migration instruction corresponding to the service type, in response to determining that the abnormal server exists in a public cloud system.

In the present embodiment, step 501 is performed in a manner similar to step 201, and details thereof are not described herein.

Step 502: generating abnormal report information according to abnormal information on the abnormal server and the service migration instruction, and sending the abnormal report information to a user who has the service of the service type, which corresponds to the service migration instruction.

In the present embodiment, step 502 is performed in a manner similar to step 202, and details thereof are not described herein.

Step 503: executing the service migration instruction corresponding to the service type of the service, to migrate the user's service, according to the migration indication information acquired from the user.

In the present embodiment, step 503 is performed in a manner similar to step 203, and details thereof are not described herein.

Step 504: executing an offline instruction to make the abnormal server offline, in response to determining that a service migration operation indicated by the service migration instruction have been performed for all services on the abnormal server.

In the present embodiment, while executing the service migration instruction corresponding to the service type of the service, the execution entity monitors whether the service on the abnormal server completes the service migration operation indicated by the service migration instruction; an offline instruction will be executed to make the abnormal server offline, in response to determining that a service migration operation indicated by the service migration instruction have been performed for all services on the abnormal server.

In some alternative implementations, the offline flow of executing an offline instruction to make the abnormal server offline includes: first, scanning the abnormal server to execute the off-line instruction again to confirm that there is no service of the user running on the abnormal server; then, stopping running underlying components supporting service running on the server; then, removing the abnormal server executing the offline instruction from the public cloud system; finally, shutting down the abnormal server to complete the operation to make the server offline, as indicated by the offline command.

As can be seen from step 501-504, compared with the embodiment shown in FIG. 2, the flow 500 of the method for processing a service of an abnormal server in the present embodiment specifically describes the processing to make the abnormal server offline that completes the service migration instruction, in this way, the execution entity automatically executes the offline instruction to make the abnormal server offline in response to determining that all services on the abnormal server have completed the service migration operation indicated by the service migration instruction, thereby improving the processing efficiency to make the abnormal server offline and the intelligence level of the present application.

In some alternative implementations of the present embodiment, step 505 is further included.

Step 505: generating abnormal processing progress information in response to determining that a preset time expires.

In the present embodiment, the preset time is a preset time for the feedback of the abnormal processing progress set by a technician according to a requirement for the technician to grasp the information on a public cloud system. Execution entity generates abnormal processing progress information periodically in response to determining that a preset time expires.

The abnormal processing progress information includes processed abnormal information, progress information on the abnormal information being processed, and unprocessed abnormal information.

As can be seen from FIG. 5, compared with the embodiment corresponding to FIG. 2, the flow 500 of the method for processing a service of an abnormal server in the present embodiment specifically describes the process as to how to make the abnormal server, which has finished the service migration instruction, offline; and describes the generation of abnormal processing progress information periodically. Therefore, the execution entity automatically makes the abnormal server offline, which has finished migration operation, thereby improving the processing efficiency to make the abnormal server offline; the related technician may also grasp the processing process to make the abnormal server offline according to the abnormal processing progress information, so as to process the offline server in time.

Figure 6:
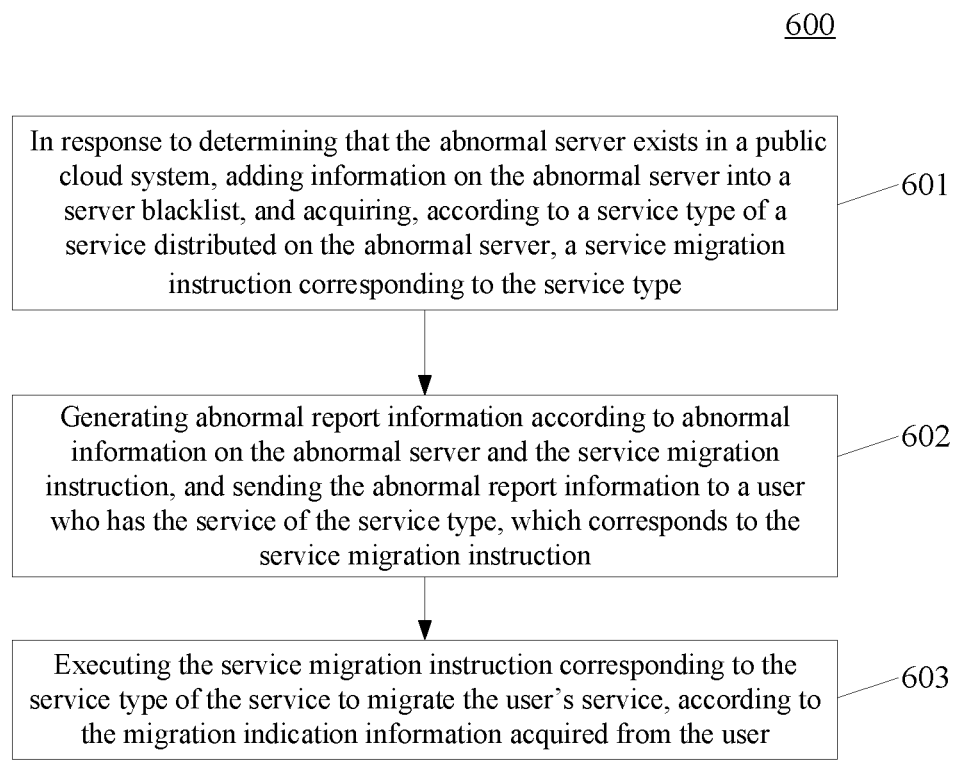
FIG. 6 is a flow chart of yet another embodiment of a method for processing a service of an abnormal server according to the present application.

Referring to FIG. 6, there is shown a schematic flow 600 of another embodiment of a method for processing a service of an abnormal server according to the present application, including the steps of:

Step 601: in response to determining that the abnormal server exists in a public cloud system, adding information on the abnormal server into a server blacklist, and acquiring, according to a service type of a service distributed on the abnormal server, a service migration instruction corresponding to the service type.

In the present embodiment, information on the abnormal server is added to the server blacklist to characterize the incremental service of blocking the abnormal server, that is, the public cloud system is prohibited from issuing other services to the abnormal server.

Of course, incremental services will not fail just due to the rejection of a few abnormal servers. Since all services in a public cloud system belong to a cluster service, that is, a plurality of servers collectively provide the same service, the public cloud system automatically selects other identical service servers and re-creates services rejected by the blacklisted abnormal servers.

In the present embodiment, the operation of acquiring, according to a service type of a service distributed on the abnormal server, a service migration instruction corresponding to the service type is performed in a manner similar to that in step 201, and details thereof are not described herein.

It should be noted that in the present embodiment, the operation of adding information on the abnormal server into a server blacklist and the operation of acquiring, according to a service type of a service distributed on the abnormal server, a service migration instruction corresponding to the service type may be performed at the same time.

Step 602: generating abnormal report information according to abnormal information on the abnormal server and the service migration instruction, and sending the abnormal report information to a user who has the service of the service type, which corresponds to the service migration instruction.

In the present embodiment, step 602 is performed in a manner similar to step 202, and details thereof are not described herein.

Step 603: executing the service migration instruction corresponding to the service type of the service, to migrate the user's service, according to the migration indication information acquired from the user.

In the present embodiment, step 603 is performed in a manner similar to step 203, and details thereof are not described herein.

As can be seen from FIG. 6, compared with the embodiment shown in FIG. 2, in the flow 600 of the method for processing a service of an abnormal server in the present embodiment, the information on the abnormal server is added into the blacklist of the server is specifically described. Thus, the public cloud system is prevented from issuing other services to the abnormal server, thereby reducing the impact of the abnormal server to the incremental services in the public cloud system; the abnormal server, information on which has been added to the blacklist, no longer accepts the service of the user, thereby improving the service migration efficiency relatively.

Figure 7:
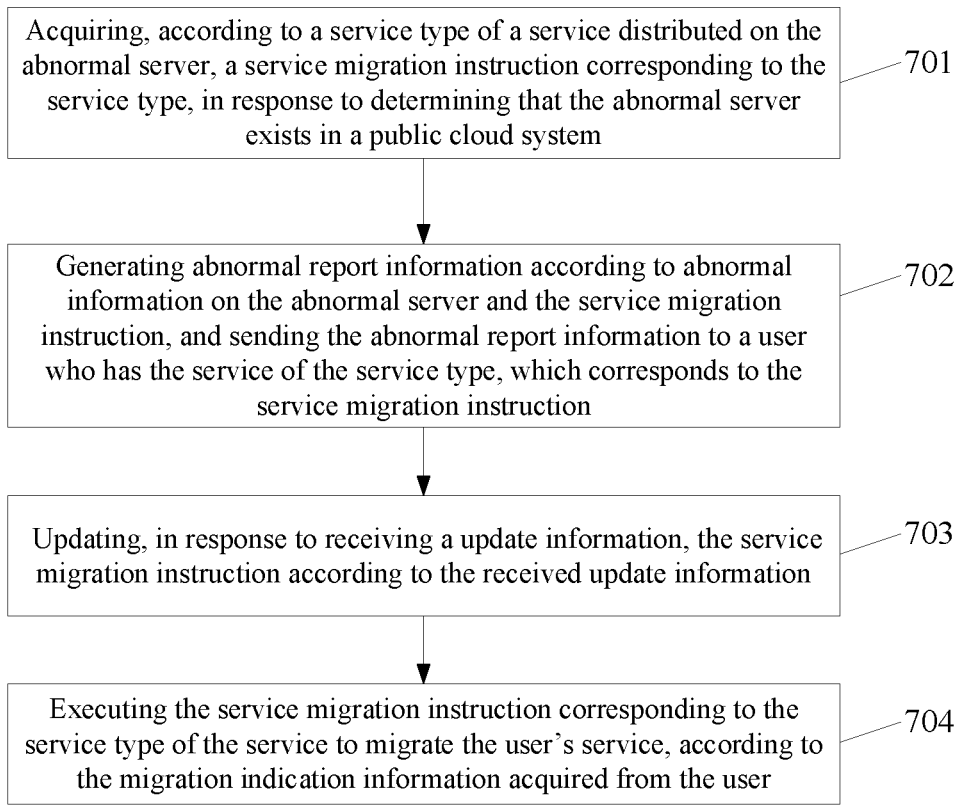
FIG. 7 is a flow chart of yet another embodiment of a method for processing a service of an abnormal server according to the present application.

Referring to FIG. 7, there is shown a schematic flow 700 of another embodiment of a method for processing a service of an abnormal server according to the present application, including the steps of:

Step 701: acquiring, according to a service type of a service distributed on the abnormal server, a service migration instruction corresponding to the service type, in response to determining that the abnormal server exists in a public cloud system.

In the present embodiment, step 701 is performed in a manner similar to step 201, and details thereof are not described herein.

Step 702: generating abnormal report information according to abnormal information on the abnormal server and the service migration instruction, and sending the abnormal report information to a user who has the service of the service type, which corresponds to the service migration instruction.

In the present embodiment, step 702 is performed in a manner similar to step 202, and details thereof are not described herein.

Step 703: updating, in response to receiving a update information, the service migration instruction according to the received update information.

In the present embodiment, after the user accepts and views the abnormal report information, the user may consider whether the relevant information in the abnormal report information meets the migration requirement of the user, so as to input an update information update service migration instruction.

In the present embodiment, the update message may be an update message used to characterize the update migration time, update the service range to be migrated. For example, the user changes the migration time for some of the services according to the operation requirements of the service.

The execution entity monitors the update message of the user, and updates the service migration instruction according to the update information in response to receiving the update information.

Step 704: executing the service migration instruction corresponding to the service type of the service to migrate the user's service, according to the migration indication information acquired from the user.

In the present embodiment, step 704 is performed in a manner similar to step 203, and details thereof are not described herein.

As can be seen from FIG. 7, compared with the embodiment shown in FIG. 2, in the flow 700 of the method for processing a service of an abnormal server in the present embodiment, the execution entity can update the service migration instruction according to the update message of the user is specifically described. Thus, the user can set the update information according to the service operation requirement of the user to update the service migration instruction, thereby meeting the personalized requirement of the user for migration, and improving the user experience.

Figure 8:
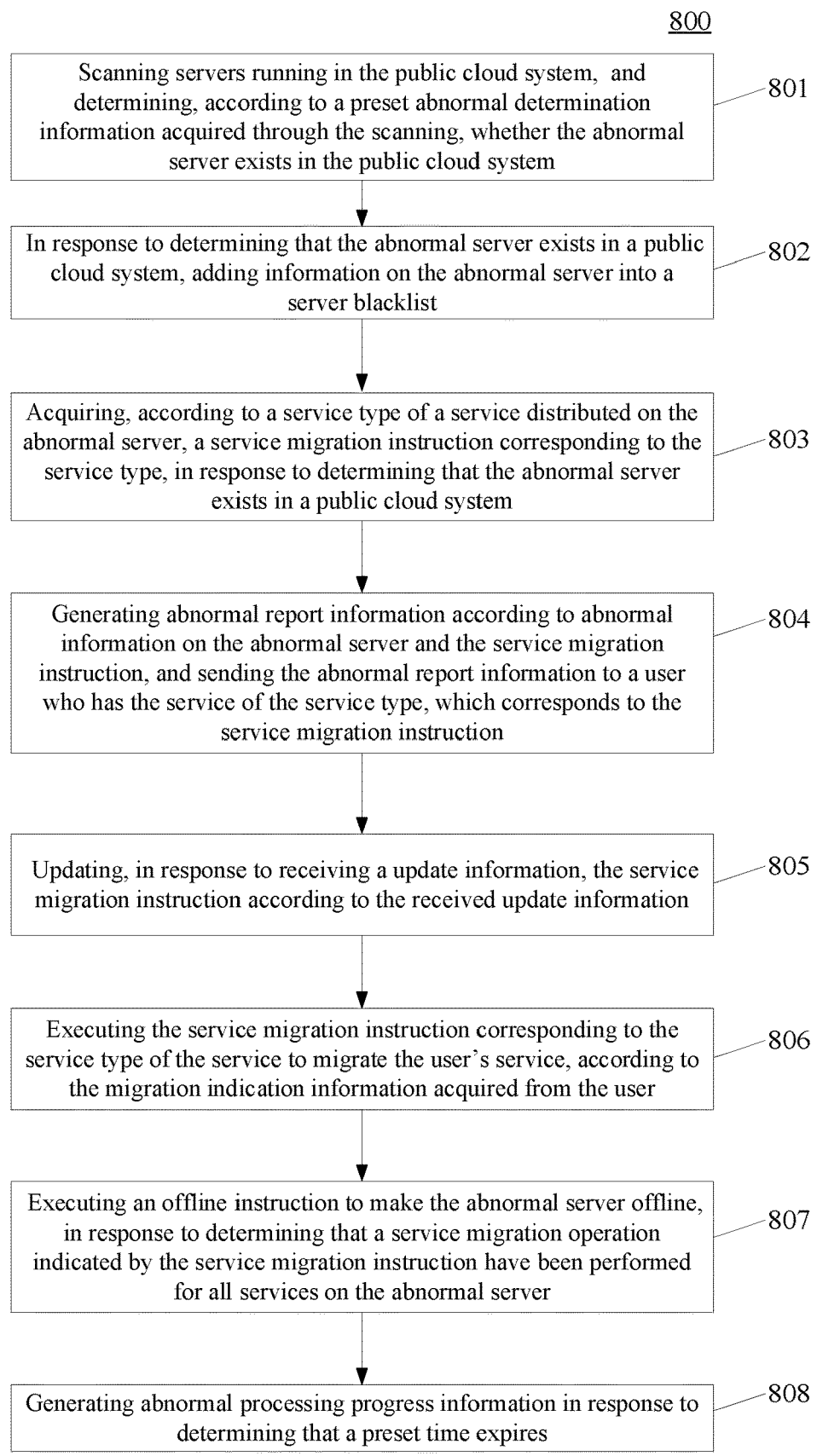
FIG. 8 is a flow chart of yet another embodiment of a method for processing a service of an abnormal server according to the present application.

Referring to FIG. 8, there is shown a schematic flow 800 of another embodiment of a method for processing a service of an abnormal server according to the present application, including the steps of:

Step 801: scanning servers running in the public cloud system; and determining, according to a preset abnormal determination information acquired through the scanning, whether the abnormal server exists in the public cloud system.

In the present embodiment, step 801 is performed in a manner similar to step 401, and details thereof are not described herein.

Step 802: in response to determining that the abnormal server exists in a public cloud system, adding information on the abnormal server into a server blacklist.

In the present embodiment, step 802 is performed in a manner similar to step 601, and details thereof are not described herein.

Step 803: acquiring, according to a service type of a service distributed on the abnormal server, a service migration instruction corresponding to the service type, in response to determining that the abnormal server exists in a public cloud system.

In the present embodiment, step 803 is performed in a manner similar to step 201, and details thereof are not described herein.

Step 804: generating abnormal report information according to abnormal information on the abnormal server and the service migration instruction, and sending the abnormal report information to a user who has the service of the service type, which corresponds to the service migration instruction.

In the present embodiment, step 804 is performed in a manner similar to step 202, and details thereof are not described herein.

Step 805: updating, in response to receiving a update information, the service migration instruction according to the received update information.

In the present embodiment, step 805 is performed in a manner similar to step 703, and details thereof are not described herein.

Step 806: executing the service migration instruction corresponding to the service type of the service to migrate the user's service, according to the migration indication information acquired from the user.

In the present embodiment, step 806 is performed in a manner similar to step 203, and details thereof are not described herein.

Step 807: executing an offline instruction to make the abnormal server offline, in response to determining that a service migration operation indicated by the service migration instruction have been performed for all services on the abnormal server.

In the present embodiment, step 807 is performed in a manner similar to step 504, and details thereof are not described herein.

Step 808: generating abnormal processing progress information in response to determining that a preset time expires.

In the present embodiment, step 808 is performed in a manner similar to step 505, and details thereof are not described herein.

As can be seen from FIG. 8, compared with the embodiment corresponding to FIG. 2, the flow 800 of the method for processing a service of an abnormal server in the present embodiment specifically illustrates that the execution entity can automatically execute the entire offline processing flow for the abnormal server, thereby improving the offline processing efficiency of the abnormal server and improving the experience of the user.

Figure 9:
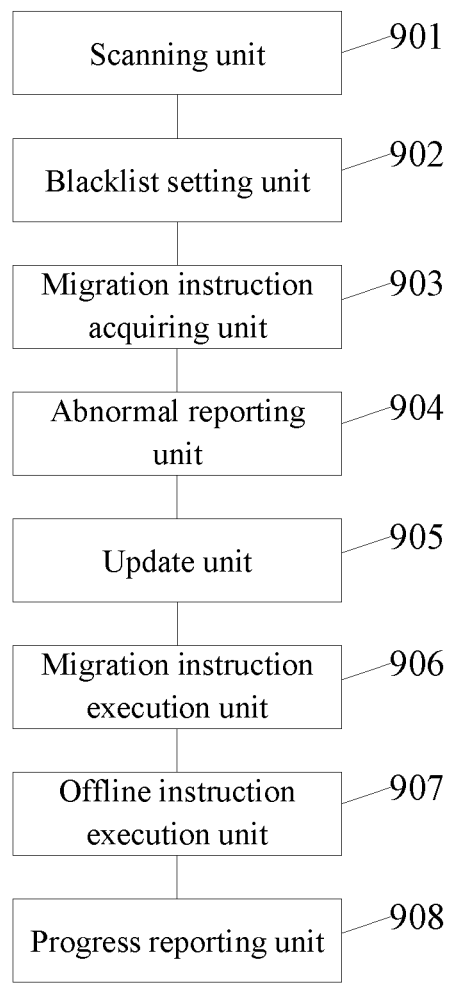
FIG. 9 is a block diagram of one embodiment of a method for processing a service of an abnormal server according to the present application.

Referring to FIG. 9, as an implementation of the method shown in each of the above figures, the present disclosure provides an embodiment of an apparatus for processing a service of an abnormal server, which corresponds to the method embodiment shown in FIG. 3, and which is particularly applicable to various electronic devices.

As shown in FIG. 9, the apparatus for processing a service of an abnormal server includes a scanning unit 901, a blacklist setting unit 902, a migration instruction acquiring unit 903, an abnormal reporting unit 904, an update unit 905, a migration instruction execution unit 906, an offline instruction execution unit 907, and a progress reporting unit 908.

The scanning unit 901 is configured to scan servers running in the public cloud system, and determine, according to a preset abnormal determination information acquired through the scanning, whether the abnormal server exists in the public cloud system; the blacklist setting unit 902 is configured to add information on the abnormal server into a server blacklist; the migration instruction acquiring unit 903 is configured to acquire, according to a service type of a service distributed on the abnormal server, a service migration instruction corresponding to the service type, in response to determining that the abnormal server exists in a public cloud system; the abnormality reporting unit 904 is configured to generate abnormal report information according to abnormal information on the abnormal server and the service migration instruction, and send the abnormal report information to a user who has the service of the service type, which corresponds to the service migration instruction; the update unit 905 is configured to in response to receiving update information, update the service migration instruction according to the received update information; a migration instruction execution unit 906 configured to execute the service migration instruction corresponding to the service type of the service to migrate user's service, according to the migration indication information acquired from the user; the offline instruction execution unit 907 is configured to execute an offline instruction to make the abnormal server offline, in response to determining that a service migration operation indicated by the service migration instruction have been performed for all services on the abnormal server; the progress reporting unit 908 is configured to generate abnormal processing progress information in response to determining that a preset time expires.

Figure 10:
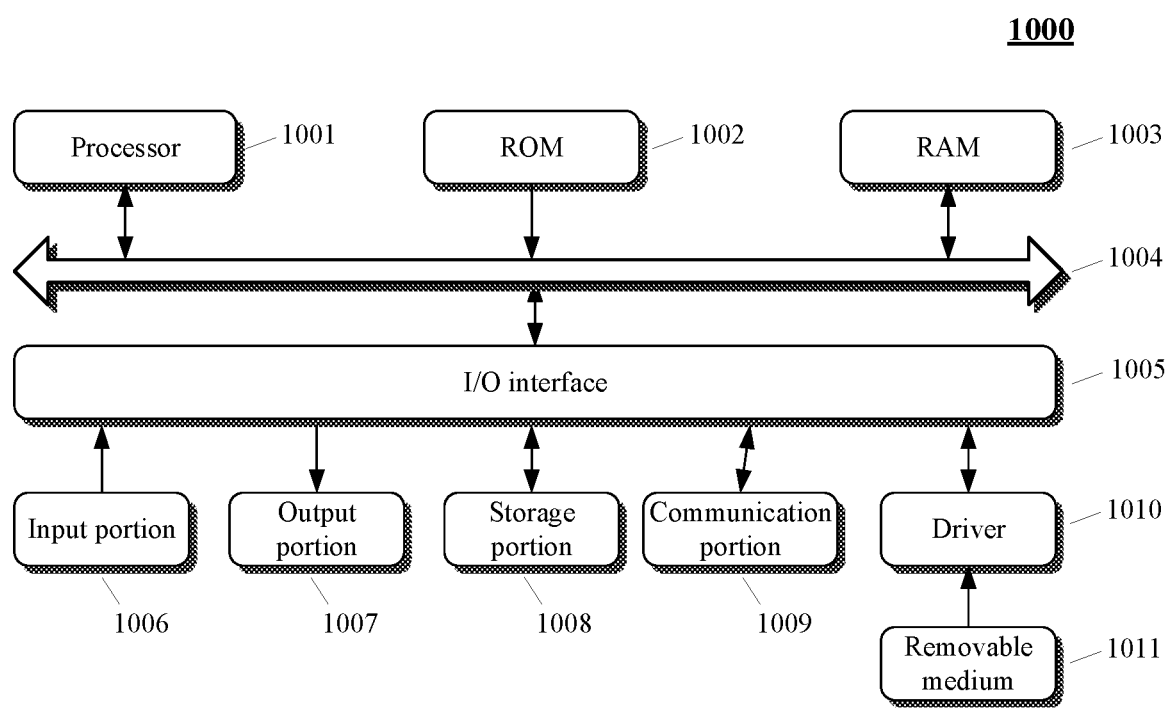
FIG. 10 is a schematic structural diagram of a computer system suitable for implementing an embodiment of the present application.

Referring now to FIG. 10, which shows a schematic structural diagram of a computer system 1000 suitable for implementing devices (e.g., devices 101, 102, 103, 105 shown in FIG. 1) of an embodiment of the present application. The devices shown in FIG. 10 is merely an example and should not be construed as limiting the functionality and scope of use of embodiments of the present application.

As shown in FIG. 10, the computer system 1000 includes a processor (e.g., CPU, central processing unit) 1001, which may execute various appropriate actions and processes in accordance with a program stored in a read-only memory (ROM) 1002 or a program loaded into a random access memory (RAM) 1003 from a storage portion 1008. The RAM 1003 also stores various programs and data required by operations of the system 1000. The processors 1001, ROM 1002, and RAM 1003 are connected to each other through a bus 1004. An input/output (I/O) interface 1005 is also connected to the bus 1004.

The following components are connected to the I/O interface 1005: an input portion 1006 including a keyboard, a mouse etc.; an output portion 1007 comprising a cathode ray tube (CRT), a liquid crystal display (LCD), a speaker etc.; a storage portion 1008 including a hard disk and the like; and a communication portion 1009 comprising a network interface card such as a LAN card and a modem. The communication portion 1009 performs communication processes via a network, such as the Internet. A driver 1010 is also connected to the I/O interface 1005 as required. A removable medium 1011, such as a magnetic disk, an optical disk, a magneto-optical disk, and a semiconductor memory, may be installed on the driver 1010, to facilitate the retrieval of a computer program from the removable medium 1011, and the installation thereof on the storage portion 1008 as needed.

In particular, according to embodiments of the present disclosure, the process described above with reference to the flow chart may be implemented in a computer software program. For example, an embodiment of the present disclosure includes a computer program product, which comprises a computer program that is embodied in a computer readable medium, the computer program comprising program codes for executing the method as illustrated in the flow chart. In such an embodiment, the computer program may be downloaded and installed from a network via the communication portion 1009, and/or may be installed from the removable medium 1011. The computer program, when executed by the processor 1001, implements the above mentioned functionalities as defined by the method of the present application.

It should be noted that the computer readable medium in the present application may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present application, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the application may be compiled using one or more programming languages or combinations thereof, the programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the apparatus, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions The units described in the embodiments of the present application may be implemented by means of software or by means of hardware. The described units may also be provided in a processor, for example, may be described as a processor including a migration instruction acquisition unit, an abnormal reporting unit, and a migration instruction execution unit. In some cases, the names of these units do not constitute a limitation on the unit itself. For example, the migration instruction acquiring unit may also be described as a unit that "acquires, according to a service type of a service distributed on the abnormal server, a service migration instruction corresponding to the service type, in response to determining that the abnormal server exists in a public cloud system".

As another aspect, the present application further provides a computer readable medium, which may be included in the device described in the above-described embodiments; It may also be present alone and not fitted into the device. The computer readable medium embodies one or more programs that, when executed by the apparatus, cause the computer device to acquire, according to a service type of a service distributed on the abnormal server, a service migration instruction corresponding to the service type, in response to determining that the abnormal server exists in a public cloud system; generate abnormal report information according to abnormal information on the abnormal server and the service migration instruction, and sending the abnormal report information to a user who has the service of the service type, which corresponds to the service migration instruction; execute the service migration instruction corresponding to the service type of the service to migrate the user's service, according to the migration indication information acquired from the user.

The above description is only a preferred embodiment of the application and a description of the technical principles employed. It should be understood by those skilled in the art that the scope of the invention referred to in this application is not limited to the technical solutions formed by specific combinations of the above-mentioned technical features, but also covers other technical solutions formed by any combination of the above-mentioned technical features or equivalents thereof without departing from the inventive concept. For example, a technical solution formed by replacing the above features with technical features having similar functions disclosed in this application (but not limited to).

What is claimed is:

1. A method for processing a service of an abnormal server, wherein the method comprises:
   acquiring, according to a service type of a service distributed on the abnormal server, a service migration instruction corresponding to the service type from a plurality of service migration instructions, in response to determining that the abnormal server exists in a public cloud system, wherein the plurality of service migration instructions is pre-stored, and each of the plurality of stored service migration instructions comprises an identifier of a service type of the each service migration instruction and information on a server for receiving a migration service of the service type of the each service migration instruction;
   generating abnormal report information according to abnormal information on the abnormal server and the service migration instruction, and sending the abnormal report information to a user who has the service of the service type, which corresponds to the service migration instruction; and
   executing the service migration instruction corresponding to the service type to migrate the user's service, according to migration indication information acquired from the user,
   wherein the service migration instruction is used for executing migration processing on the service of the service type in the abnormal server, wherein each service migration instruction corresponds to one service type, wherein before the acquiring, according to the service type of the service distributed on the abnormal server, the service migration instruction corresponding to the service type from the plurality of service migration instructions, in response to determining that the abnormal server exists in a public cloud system, the method further comprises:
   scanning servers running in the public cloud system; and
   determining, according to a preset abnormal determination information acquired through the scanning, whether the abnormal server exists in the public cloud system.

2. The method according to claim 1, wherein after the executing, on user's service, the service migration instruction corresponding to the service type, according to the migration indication information acquired from the user, the method further comprises:
   executing an offline instruction to make the abnormal server offline, in response to determining that a service migration operation indicated by the service migration instruction has been performed for all services on the abnormal server.

3. The method according to claim 2, wherein the method further comprises:
generating abnormal processing progress information in response to determining that a preset time expires, wherein the abnormal processing progress information includes processed abnormal information, abnormal information being processed, and unprocessed abnormal information.

4. The method according to claim 1, wherein after in response to determining that the abnormal server exists in a public cloud system, the method further comprises:
adding information on the abnormal server into a server blacklist.

5. The method according to claim 1, wherein after generating abnormal report information according to abnormal information on the abnormal server and the service migration instruction, and sending the abnormal report information to a user who has the service of the service type, which corresponds to the service migration instruction, the method further comprises:
updating, in response to receiving update information, the service migration instruction according to the received update information.

6. The method according to claim 5, wherein the update information comprises update information used to characterize an update migration time, and update information used to characterize an update service range to be migrated.

7. The method according to claim 1, wherein each of the plurality of stored service migration instructions comprises a migration time, and flow information of service migration.

8. The method according to claim 1, wherein abnormal information on the abnormal server comprises abnormal information indicating hardware failure, abnormal information indicating a software failure, abnormal information indicating a component failure, and abnormal information indicating an exceeding of a warranty period.

9. The method according to claim 1, wherein the abnormal report information comprises abnormal information, an abnormal impact, an impact range, an impact duration, and a migration time of the service migration instruction.

10. A apparatus for processing a service of an abnormal server, wherein the apparatus comprises:
one or more processors;
storage devices, with one or more programs store thereon;
wherein, the one or more programs, when executed by the one or more processors, cause the one or more processors to,
acquire, according to a service type of a service distributed on the abnormal server, a service migration instruction corresponding to the service type from a plurality of service migration instructions, in response to determining that the abnormal server exists in a public cloud system, wherein the plurality of service migration instructions is pre-stored, and each of the plurality of stored service migration instructions comprises an identifier of a service type of the each service migration instruction and information on a server for receiving a migration service of the service type of the each service migration instruction;
generate abnormal report information according to abnormal information on the abnormal server and the service migration instruction, and send the abnormal report information to a user who has the service of the service type, which corresponds to the service migration instruction;
execute the service migration instruction corresponding to the service type to migrate user's service, according to migration indication information acquired from the user, wherein the service migration instruction is used for executing migration processing on the service of the service type in the abnormal server, wherein each service migration instruction corresponds to one service type; and
add information on the abnormal server into a server blacklist.

11. The apparatus according to claim 10, wherein, the one or more programs, when executed by the one or more processors, further cause the one or more processors to:
scan servers running in the public cloud system, and
determine, according to a preset abnormal determination information acquired through the scanning, whether the abnormal server exists in the public cloud system.

12. The apparatus according to claim 10, wherein the one or more programs, when executed by the one or more processors, cause the one or more processors to,
execute an offline instruction to make the abnormal server offline, in response to determining that a service migration operation indicated by the service migration instruction have been performed for all services on the abnormal server.

13. The apparatus according to claim 12, wherein the one or more programs, when executed by the one or more processors, cause the one or more processors to,
generate abnormal processing progress information in response to determining that a preset time expires, wherein the abnormal processing progress information includes processed abnormal information, abnormal information being processed, and unprocessed abnormal information.

14. The apparatus according to claim 10, wherein the one or more programs, when executed by the one or more processors, further cause the one or more processors to,
in response to receiving update information, update the service migration instruction according to the received update information.

15. A non-transitory computer readable storage medium storing a plurality of instructions, that when executed by a processor, implements a method comprising:
acquiring, according to a service type of a service distributed on an abnormal server, a service migration instruction corresponding to the service type from a plurality of service migration instructions, in response to determining that the abnormal server exists in a public cloud system, wherein the plurality of service migration instructions is pre-stored, and each of the plurality of stored service migration instructions comprises an identifier of a service type of the each service migration instruction and information on a server for receiving a migration service of the service type of the each service migration instruction;
generating abnormal report information according to abnormal information on the abnormal server and the service migration instruction, and sending the abnormal report information to a user who has the service of the service type, which corresponds to the service migration instruction; and executing the service migration instruction corresponding to the service type to migrate the user's service, according to migration indication information acquired from the user, wherein the service migration instruction is used for executing migration processing on the service of the service type in the abnormal server, wherein each service migration instruction corresponds to one service type, wherein before the acquiring, according to the service type of the service distributed on the abnormal server, the service migration instruction corresponding to the service type from a plurality of service migration instructions, in response to determining that the abnormal server exists in a public cloud system, the method further comprises:

scanning servers running in the public cloud system; and determining, according to a preset abnormal determination information acquired through the scanning, whether the abnormal server exists in the public cloud system.

* * * * *